US007448311B2

(12) United States Patent
Naruse et al.

(10) Patent No.: US 7,448,311 B2
(45) Date of Patent: Nov. 11, 2008

(54) DISPLACEMENT DIFFERENCE-ABSORBING MECHANISM FOR CYLINDER APPARATUS

(75) Inventors: Tetsuya Naruse, Kashiwa (JP); Kazuhiro Iida, Toride (JP)

(73) Assignee: SMC Kabushiki Kaisha, Tokyo (JP)

( * ) Notice: Subject to any disclaimer, the term of this patent is extended or adjusted under 35 U.S.C. 154(b) by 240 days.

(21) Appl. No.: 11/405,599

(22) Filed: Apr. 18, 2006

(65) Prior Publication Data

US 2006/0230923 A1 Oct. 19, 2006

(30) Foreign Application Priority Data

Apr. 19, 2005 (JP) .............................. 2005-121091

(51) Int. Cl.
*F15B 15/24* (2006.01)
*F16J 10/02* (2006.01)

(52) U.S. Cl. ........................................ 92/88; 92/165 R

(58) Field of Classification Search ..................... 92/88, 92/165 R

See application file for complete search history.

(56) References Cited

U.S. PATENT DOCUMENTS 4,664,019 A 5/1987 Lipinski et al.
5,275,088 A * 1/1994 Takada et al. .................. 92/88
5,279,207 A * 1/1994 Takada et al. .................. 92/88
5,311,810 A * 5/1994 Takada et al. .................. 92/88
5,317,957 A * 6/1994 Miyamoto ..................... 92/88
5,333,535 A * 8/1994 Miyamoto et al. ............. 92/88
6,098,521 A 8/2000 Iida
6,694,865 B2 * 2/2004 Kaneko et al. ................. 92/88
2002/0181809 A1 12/2002 Moshammer

FOREIGN PATENT DOCUMENTS

JP 60-234106 11/1985
JP 7-1041 1/1995
JP 11-93908 4/1999
WO WO 02/086341 A2 10/2002

* cited by examiner

*Primary Examiner*—Thomas E Lazo
(74) *Attorney, Agent, or Firm*—Paul A. Guss

(57) ABSTRACT

A coupler is provided inside an engaging hole of a piston yoke, which is connected to pistons. A slider is installed on an upper portion of the coupler through a coupler-insertion hole. An engaging member, provided at a lower portion of the coupler, is inserted into the engaging hole so as to be displaceable by a slight amount in the widthwise direction of a cylinder tube. The coupler is inserted into the coupler-insertion hole of the slider, so that the coupler-insertion hole is slidable with respect to curved surface sections of the coupler.

13 Claims, 13 Drawing Sheets

20

DISPLACEMENT DIFFERENCE-ABSORBING MECHANISM FOR CYLINDER APPARATUS

BACKGROUND OF THE INVENTION

1. Field of the Invention

The present invention relates to a displacement difference-absorbing mechanism for a cylinder apparatus, the displacement difference-absorbing mechanism being capable of absorbing a displacement difference generated between a displacement-transmitting member and a displacement member that is displaceable along a main cylinder body. The displacement difference-absorbing mechanism further is capable of suppressing loads applied from the displacement member to the displacement-transmitting member.

2. Description of the Related Art

A cylinder apparatus such as a rodless cylinder has been used as a means for transporting a workpiece. The cylinder apparatus includes a piston, which is displaceable within a main cylinder body, and wherein a piston yoke, which is connected to the piston, is exposed to the outside through a slit formed on an upper portion of the main cylinder body. A slider is integrally installed on the piston yoke. The slider is displaced in the axial direction of the main cylinder body due to displacement of the piston, in order to transport the workpiece.

In the rodless cylinder described above, when a load (for example, a pressing force) is applied to the slider, for example, by a workpiece, then the piston becomes inclined due to the load, and a nonuniform load is exerted on the piston seal and the piston. As a result, air leakage and/or an increase in sliding resistance is brought about in the rodless cylinder, as a result of the displacement difference caused by the load. It is impossible to smoothly displace the slider in the axial direction in some cases.

In view of the above, a rodless cylinder has been suggested, which is provided with a displacement difference-absorbing mechanism that is capable of absorbing the displacement difference generated between the slider and the piston yoke. The rodless cylinder comprises a disk-shaped bearing, which is provided between a guide element that functions as the slider and a load-transmitting element that applies the displacement load. The guide element is retained rotatably within a substantially horizontal plane about the central axis of the bearing. Further, the guide element is displaceable a predetermined amount in a vertical direction with respect to the bearing. More specifically, in this arrangement, a displacement difference, which is generated on the guide element and the load-transmitting element when a load is applied to the guide element, is absorbed by displacement of the guide element with respect to the bearing (see, for example, Japanese Laid-Open Patent Publication No. 60-234106).

However, in the case of the displacement difference-absorbing mechanism disclosed in Japanese Laid-Open Patent Publication No. 60-234106, when a displacement difference is generated in relation to the guide element, the mechanism can only absorb displacement differences that occur in a vertical direction, substantially perpendicular to the displacement direction of the guide element, and in a rotational direction centered about the vertical direction.

Another displacement difference-absorbing mechanism, which is provided externally of a rodless cylinder, as disclosed in Japanese Patent Publication No. 7-1041, is constructed in the following manner. That is, a circular arc-shaped surface, which is formed on an engaging projection, makes line-to-line contact with an abutment tab connected to both end surfaces of a slider, wherein the displacement difference is absorbed by displacement of the slider about the center of the abutment portion. However, in the case of the rodless cylinder disclosed in Japanese Patent Publication No. 7-1041, the contact area between the circular arc-shaped surface and the abutment tab is small. Therefore, it is difficult to handle large loads in the displacement direction.

In order to solve the aforementioned problems, the present applicant has proposed a displacement difference-absorbing mechanism for a rodless cylinder, in which it is possible to absorb displacement differences brought about in a horizontal direction, substantially perpendicular to the displacement direction of a slider that is provided outside the rodless cylinder, as well as in a rotational direction about the center of the displacement direction of the slider. Further, the mechanism is responsive even when large displacement differences are generated (see Japanese Laid-Open Patent Publication No. 11-93908).

As shown in FIG. 13, the rodless cylinder comprises a movable member 2, which is provided on an upper surface of a cylinder tube 1, and which is displaceable in the axial direction. A displacement difference-absorbing mechanism 3 is provided at both ends of the movable member 2. The displacement difference-absorbing mechanism 3 comprises a pair of end covers 5*a*, 5*b*, which are fixed to respective ends of a slider 4 formed integrally with the movable member 2, and a pair of couplers 8*a*, 8*b*, each of which has a circular arc-shaped curved surface section 6 disposed on one side surface thereof, and a flat section 7 disposed on the other side surface. The couplers 8*a*, 8*b* are positioned with respect to the movable member 2 through the aid of plate-shaped stoppers 9*a*, 9*b*. The couplers 8*a*, 8*b* are slidably inserted, in a state in which the curved surface sections 6 of the couplers 8*a*, 8*b* make surface-to-surface contact with recesses 10 provided in the end covers 5*a*, 5*b*.

When a displacement difference is generated in the horizontal direction substantially perpendicular to the displacement direction of the movable member 2, or when a displacement difference is generated in the rotational direction about a central vertical line, the couplers 8*a*, 8*b* are slidably displaced through contact surfaces of the stoppers 9*a*, 9*b*, which are provided between the couplers 8*a*, 8*b* and the movable member 2, and thus the displacement difference generated in the movable member 2 is absorbed.

In the case of the displacement difference-absorbing mechanism described above, a large number of parts is required, and the structure of the displacement difference-absorbing mechanism is complicated. Further, it is difficult to install the displacement difference-absorbing mechanism on the rodless cylinder.

SUMMARY OF THE INVENTION

A general object of the present invention is to provide a displacement difference-absorbing mechanism for a cylinder apparatus, in which the displacement difference-absorbing mechanism is capable of absorbing displacement differences in various directions that are transmitted from a displacement member to a displacement-transmitting member, wherein the mechanism improves durability by suppressing generation of stresses when a displacement difference is caused in relation to the displacement member, and wherein the mechanism has a simple structure that can be arranged easily within the cylinder apparatus.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
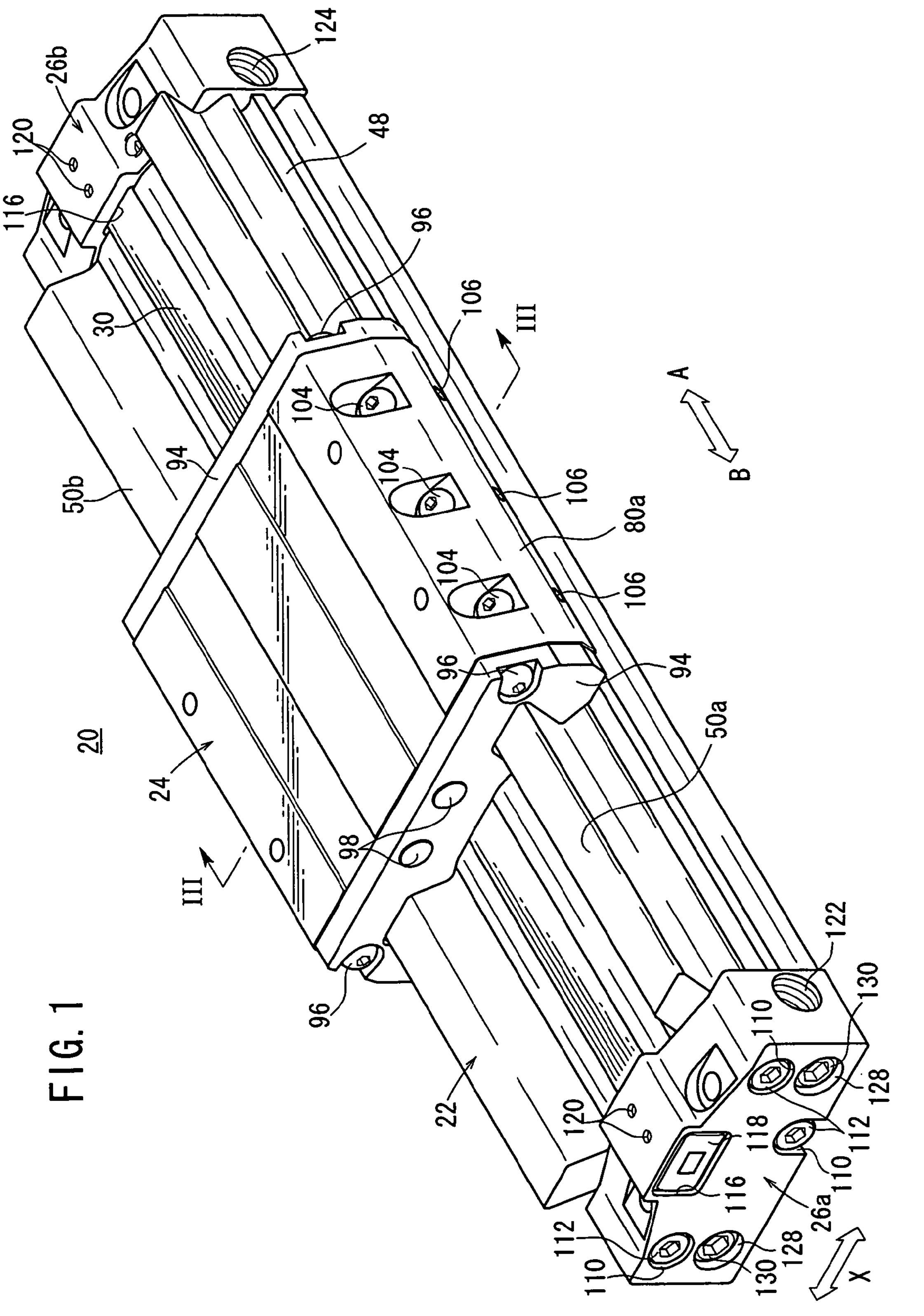
FIG. 1 is a perspective view illustrating a cylinder apparatus according to an embodiment of the present invention.

With reference to FIG. 1, reference numeral 20 indicates a cylinder apparatus to which a displacement difference-absorbing mechanism according to an embodiment of the present invention is applied.

Figure 2:
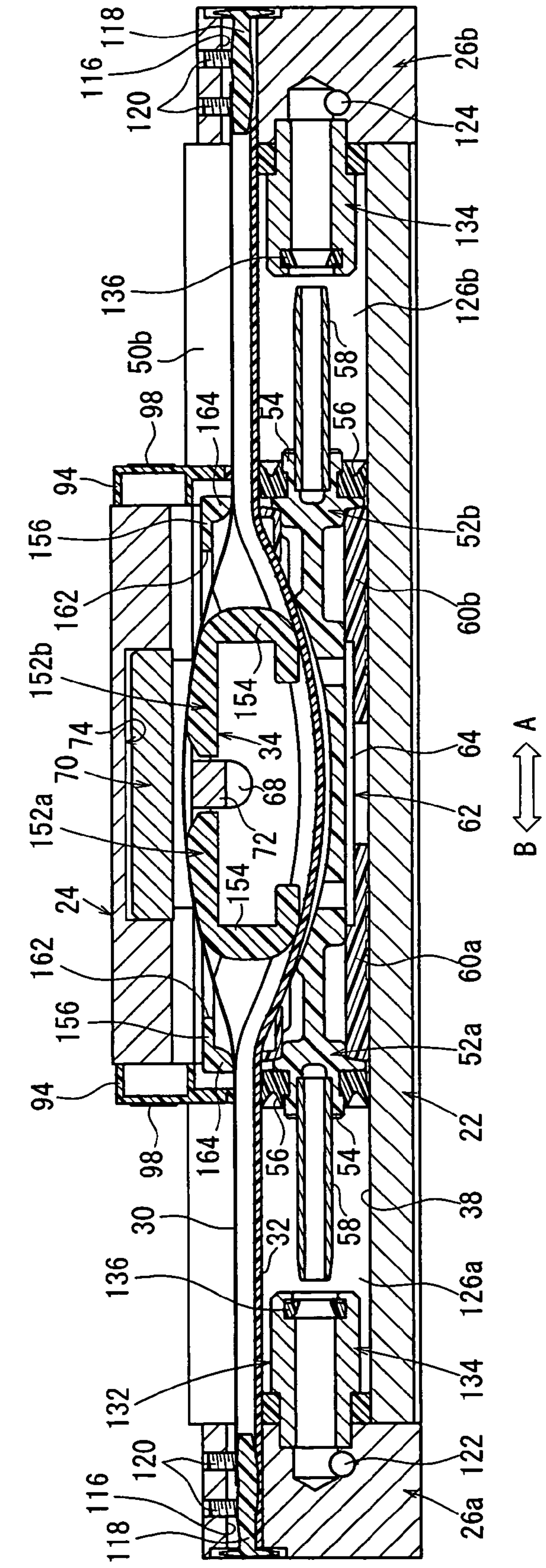
FIG. 2 is a longitudinal sectional view taken in the axial direction, illustrating the cylinder apparatus shown in FIG. 1.

As shown in FIGS. 1 and 2, the cylinder apparatus 20 comprises a cylinder tube (main cylinder body) 22 having a longitudinal axial direction, a slider (displacement member) 24, which is attached to the cylinder tube 22 for movement back and forth in the axial direction, and a pair of end blocks 26*a*, 26*b*, which are installed on respective ends of the cylinder tube 22.

The cylinder apparatus 20 further comprises a displacement difference-absorbing mechanism 28 (hereinafter simply referred to as an "absorbing mechanism 28"), which is disposed between the cylinder tube 22 and the slider 24, and which absorbs loads applied to the slider 24, a belt guide mechanism 34 (see FIG. 2) that guides an upper belt (belt) 30 and a lower belt 32 installed in the cylinder tube 22, and a guide mechanism 36 (see FIG. 3), which smoothly guides the slider 24 with respect to the cylinder tube 22.

Figure 3:
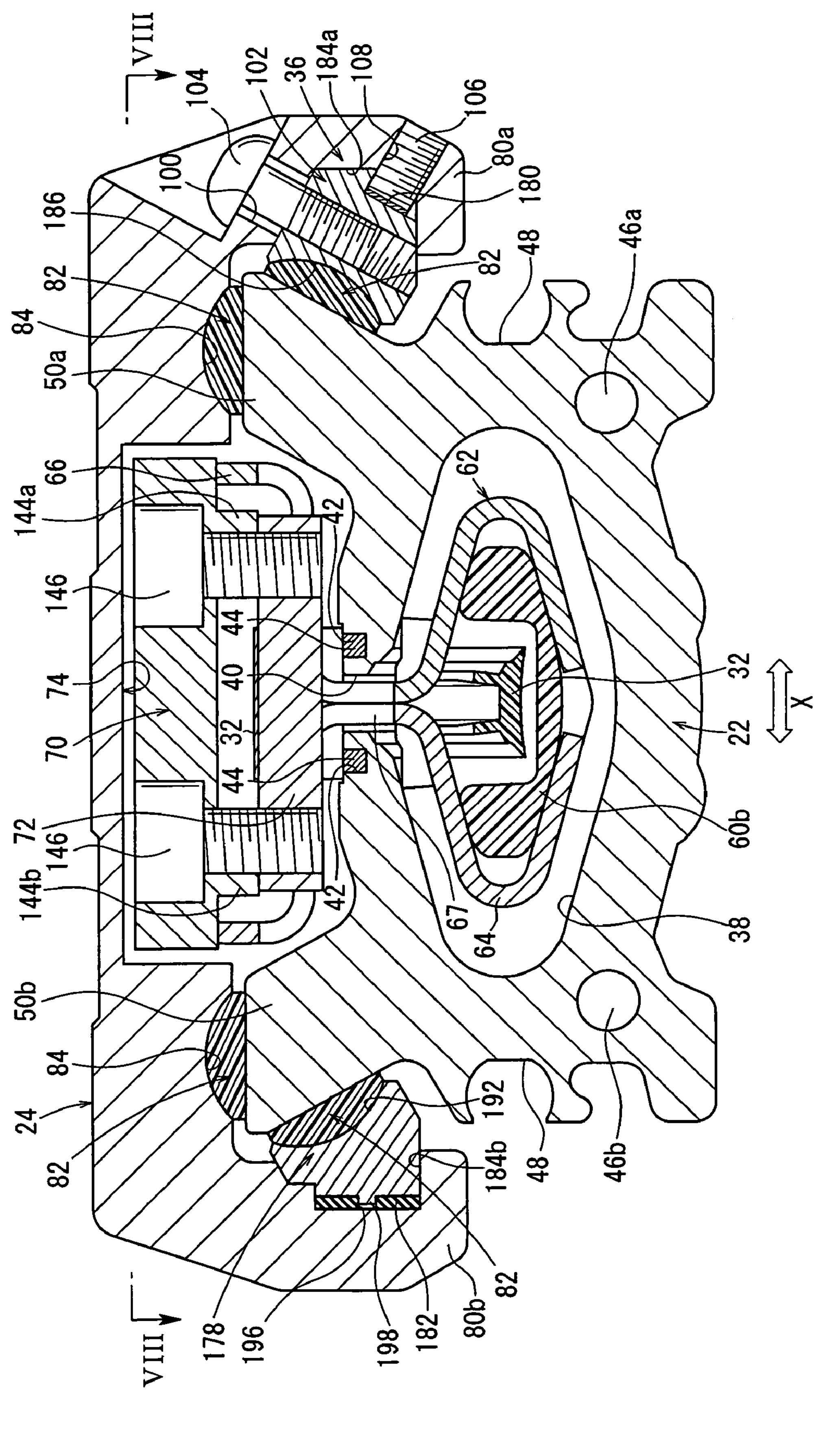
FIG. 3 is a sectional view taken along line III-III shown in FIG. 1.
Figure 4:
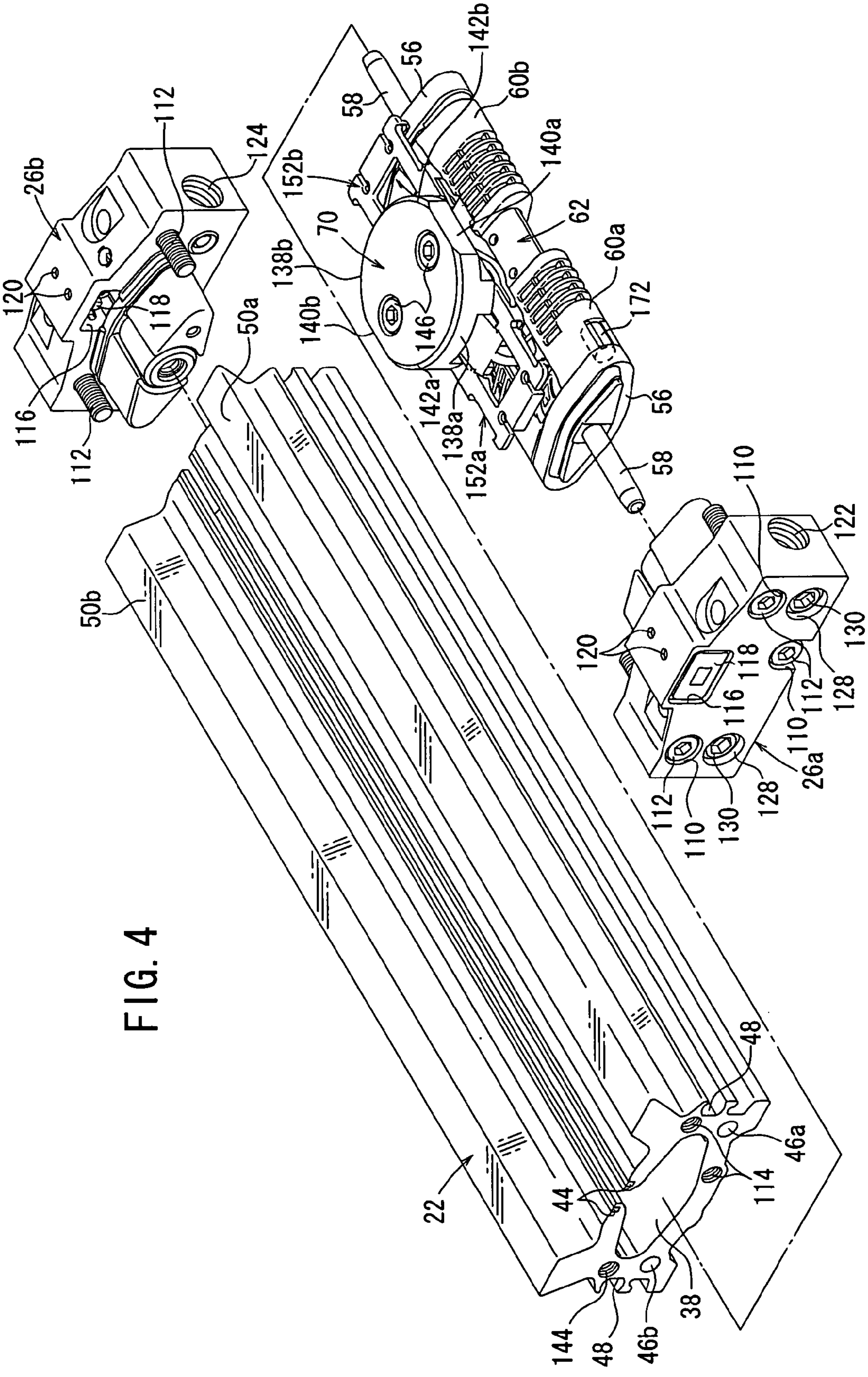
FIG. 4 is, with partial omission, an exploded perspective view illustrating the cylinder apparatus shown in FIG. 1.

As shown in FIGS. 3 and 4, a bore section 38, which has a substantially lozenge-shaped cross section, is formed in the axial direction in the cylinder tube 22. A slit 40, which is open in the axial direction, is formed along an upper surface of the cylinder tube 22. The bore section 38 communicates with the outside via the slit 40.

The upper belt 30 and the lower belt 32, which seal and close the slit 40 in both upward and downward vertical directions, are attached to the slit 40 of the cylinder tube 22. The upper belt 30 is formed of, for example, a metal material having a sheet-shaped form. The lower belt is formed of a resin material, for example.

A pair of magnetic members 44 (e.g., permanent magnets) is installed in attachment grooves 42 that extend in the axial direction on both sides of the slit 40. The upper belt 30 is attracted by magnetic forces produced by the magnetic members 44, whereby the slit 40 is closed along the upper portion thereof. Both ends of the upper belt 30 and the lower belt 32 are fixed respectively to end blocks 26*a*, 26*b*, which are connected respectively to both ends of the cylinder tube 22 (see FIG. 2).

Two bypass passages 46*a*, 46*b*, which extend in the axial direction, are formed respectively in the vicinity of the bore section 38 of the cylinder tube 22. Concentrated piping (not shown), through which a pressure fluid is allowed to flow, is connected to the bypass passages 46*a*, 46*b*.

On the other hand, one or more pairs of sensor attachment grooves 48, which extend in the axial direction, are formed on both side surfaces of the cylinder tube 22. A position-detecting sensor (not shown) is installed in the sensor attachment groove 48, in order to detect a displacement position of pistons 52*a*, 52*b*, as described later on.

As shown in FIG. 3, a pair of guide sections 50*a*, 50*b*, each of which protrudes upwardly by a predetermined height, and which are separated from each other by a predetermined distance in the widthwise direction (direction of arrow X) perpendicular to the axis of the slit 40, are formed on the upper surface of the cylinder tube 22. The guide sections 50*a*, 50*b* extend in the axial direction of the cylinder tube 22. The slider 24 engages with the guide sections 50*a*, 50*b* for displacement in the axial direction by means of the guide mechanism 36.

Figure 5:
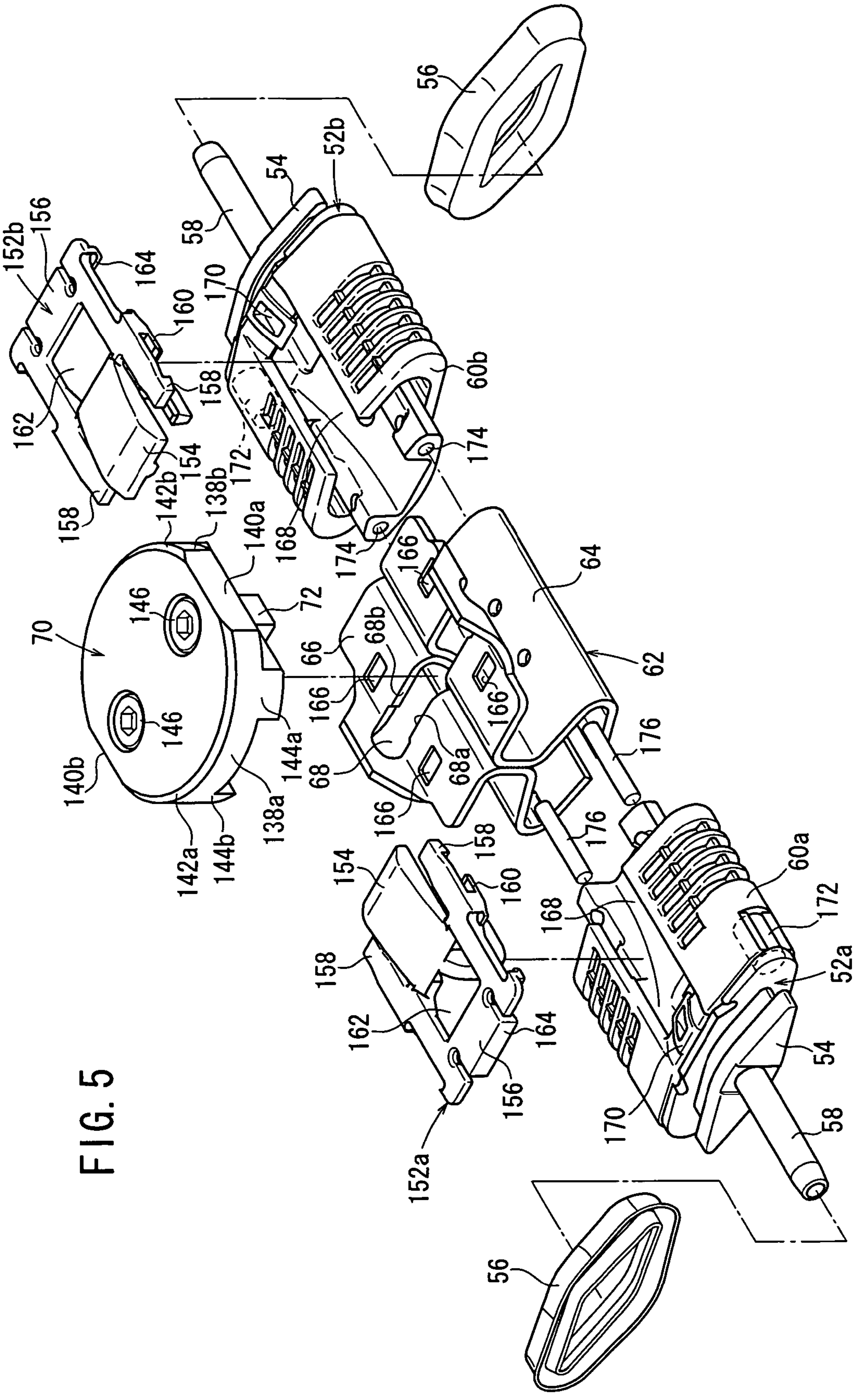
FIG. 5 is an exploded perspective view illustrating a coupler and a belt guide mechanism of the cylinder apparatus shown in FIG. 1.

As shown in FIGS. 4 and 5, a pair of pistons 52*a*, 52*b*, which are shaped complementary to the cross-sectional shape of the bore section 38, are movably disposed back and forth within the bore section 38 of the cylinder tube 22. A projection 54 is formed at one end of each of the pistons 52*a*, 52*b*. Annular seal members 56 are installed on the circumferential edge of the projections 54. More specifically, when the pistons 52*a*, 52*b* are inserted into the bore section 38 of the cylinder tube 22, spaces between the pistons 52*a*, 52*b* and the inner wall surface of the bore section 38 are sealed by the seal members 56. Accordingly, air-tightness is retained within the bore section 38.

Shaft sections 58 are provided on the projections 54 of the pistons 52*a*, 52*b*, so that the shaft sections 58 protrude toward the end blocks 26*a*, 26*b*.

A piston yoke (displacement-transmitting member) 62 is interposed between one piston 52*a* and the other piston 52*b* through wear rings 60*a*, 60*b*. The piston yoke 62 is integrally connected to the pistons 52*a*, 52*b*. The piston yoke 62 includes an insertion section 64, which is formed to have a substantially lozenge-shaped cross section, corresponding to the cross-sectional shape of the bore section 38. A substantially T-shaped yoke section 66 is disposed above the insertion section 64.

As shown in FIG. 3, the piston yoke 62 is installed into the cylinder tube as follows. The insertion section 64 is inserted into the bore section 38 in the same manner as the pistons 52*a*, 52*b*. The connecting portion 67 between the insertion section 64 and the yoke section 66 is inserted into the slit 40, so that the yoke section 66 is disposed on the upper side of the cylinder tube 22.

The yoke section 66 is formed so that the width thereof is expanded, to have a predetermined width in the widthwise direction (direction of arrow X) of the cylinder tube 22. As shown in FIG. 5, an engaging hole (second fitting hole) 68, which extends in the widthwise direction (direction of arrow X), is formed substantially centrally in the yoke section 66. A coupler (displacement difference-absorbing member) 70 (described later on) of the absorbing mechanism 28 is installed in the substantially rectangular engaging hole 68, by means of an engaging member 72 (described later on) installed on the lower surface thereof.

As shown in FIGS. 1 to 3, the slider 24 is formed with a substantially U-shaped cross section. A coupler-insertion hole (first fitting hole) 74, into which the coupler 70 of the absorbing mechanism 28 is inserted, forms a recess, recessed a predetermined depth on the lower surface side opposed to the cylinder tube 22 (see FIGS. 6 and 7). As shown in FIGS. 7 and 8, two circular arc surfaces 76*a*, 76*b* are formed in the coupler-insertion hole 74. Further, two inner flat surface sections 78*a*, 78*b*, which are substantially parallel to the axis of the cylinder tube 22, also are formed in the coupler-insertion hole 74.

In other words, the circular arc surfaces 76*a*, 76*b* are formed in the displacement direction of the slider 24, and the inner flat surface sections 78*a*, 78*b* are formed substantially in parallel in the displacement direction of the slider 24, so that the inner flat surface sections 78*a*, 78*b* are disposed between one of the circular arc surfaces 76*a*, 76*b* and the other of the circular arc surfaces 76*a*, 76*b*.

As shown in FIG. 3, the slider 24 is provided with a pair of retaining sections 80*a*, 80*b*, which protrude in a vertical downward direction and which are formed on both sides of the slider 24 in the widthwise direction (direction of arrow X). The retaining sections 80*a*, 80*b* engage with the guide sections 50*a*, 50*b* of the cylinder tube 22 through the guide mechanism 36. As described above, the slider 24 is integrally attached to the pistons 52*a*, 52*b* through the coupler 70 and the piston yoke 62. Therefore, the slider 24 is displaced in the axial direction while being guided by the guide sections 50*a*, 50*b*, under a displacement action of the pistons 52*a*, 52*b*.

Figure 10:
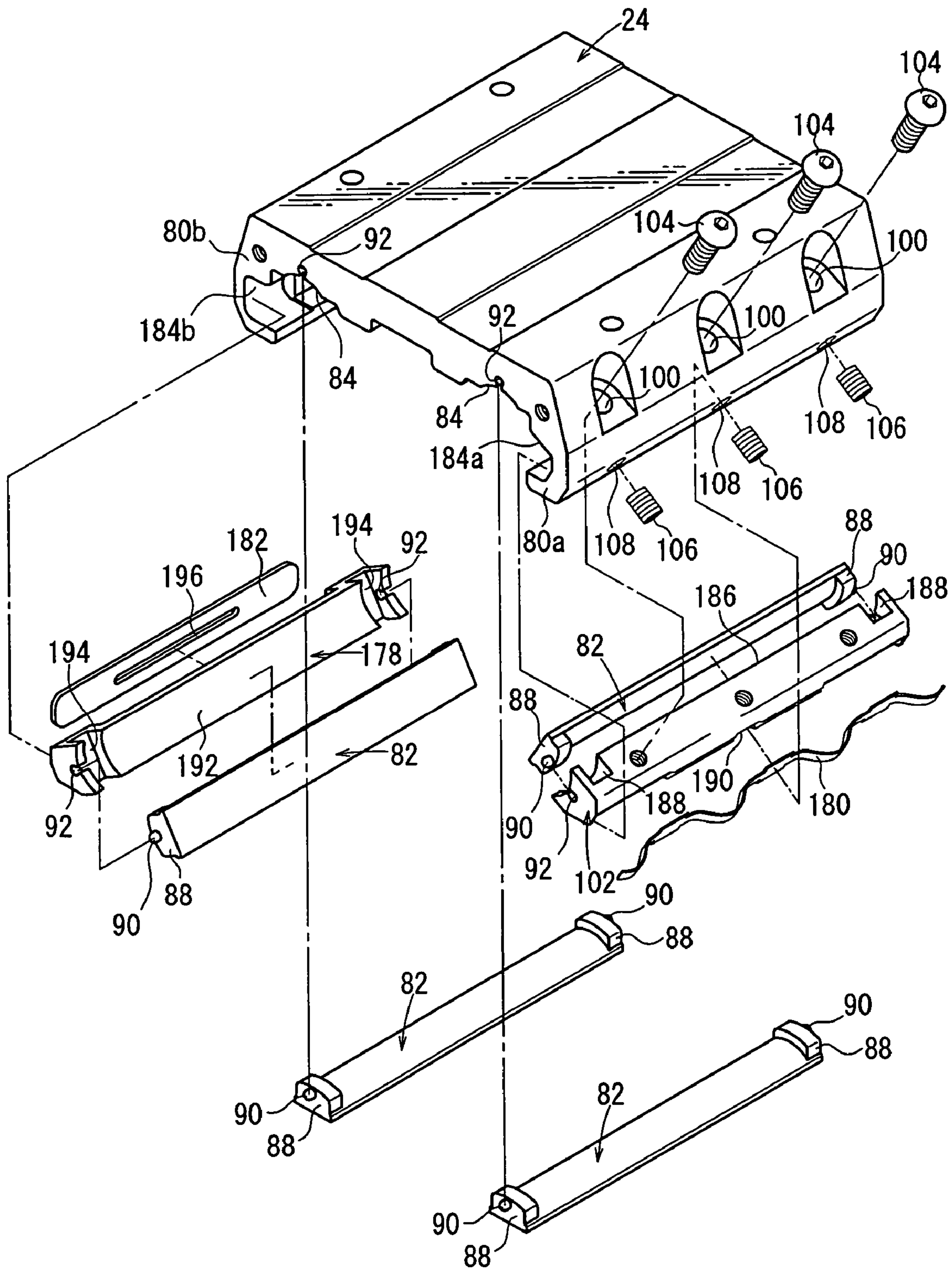
FIG. 10 is an exploded perspective view illustrating a guide mechanism of the cylinder apparatus shown in FIG. 1.

As shown in FIGS. 3 and 7, retaining grooves 84 for retaining bearings 82 are formed on the lower surface of the slider 24 at respective positions opposed to the guide sections 50*a*, 50*b* of the cylinder tube 22. Deep grooves 86, which are deeper than the depth of the retaining grooves 84, are formed at both ends of the retaining grooves 84 in the axial direction of the slider 24. As shown in FIG. 10, the bearings 82 have flange sections 88 protruding at both ends and are installed in the retaining grooves 84. The flange sections 88 engage within the deep grooves 86.

The bearings 82 further have projections 90, which protrude toward the end blocks 26*a*, 26*b* respectively and are formed on end surfaces of the flange sections 88. When the flange sections 88 engage within the deep grooves 86, the projections 90 engage with recesses 92, which are formed on end surfaces of the slider 24.

As shown in FIG. 1, cover members 94 are installed on both ends of the slider 24 through bolts 96 so that both ends are covered thereby. Fastening members 98 are provided at substantially central portions of the cover members 94. The fastening members 98 slightly protrude from the end surfaces of the cover members 94 toward the end blocks 26*a*, 26*b* (see FIG. 2). Accordingly, for example, when an unillustrated stopper mechanism is provided for the cylinder tube 22, and a displacement amount of the slider 24 is regulated by abutment of the end surface of the slider 24 against the stopper mechanism, then it is possible to buffer the impact when the slider 24 and the stopper mechanism make contact with each other, by means of the fastening member 98.

As shown in FIGS. 3 and 10, the slider 24 has a plurality of (for example, three) through-holes 100, which are formed in one retaining section 80*a*. Fixing bolts 104 are inserted into the through-holes 100 in order to fix a first bearing support member 102 of the guide mechanism 36 (as described later on). The through-holes 100 are separated by predetermined distances in the axial direction of the slider 24. Further, the through-holes 100 are inclined by a predetermined angle so that the through-holes 100 are substantially in parallel to the side surface of the guide section 50*a*, when the slider 24 is installed on the cylinder tube 22.

The retaining section 80*a* has a plurality of screw holes 108 with which plugs 106 are screw-engaged, and which are disposed at positions below portions where the through-holes 100 are formed. The screw holes 108 extend at an angle substantially perpendicular to the side surface of the guide section 50*a* of the cylinder tube 22, when the slider 24 is installed on the cylinder tube 22.

As shown in FIGS. 1, 2, and 4, end blocks 26*a*, 26*b* are provided at both respective ends of the cylinder tube 22, so that the openings of the bore section 38 are closed. Screw members 112 are installed in screw-installing holes 110 of the end blocks 26*a*, 26*b*. The screw members 112 engage with screw holes 114 (see FIG. 4) of the cylinder tube 22. Accordingly, the end blocks 26*a*, 26*b* are integrally assembled to the cylinder tube 22.

As shown in FIG. 2, the end blocks 26*a*, 26*b* have holes 116 formed at upper portions thereof for insertion of the upper belt 30 and the lower belt 32. The ends of the upper belt 30 and the lower belt 32 are fixed by two pairs of fixing screws 120 through fixing members 118 that are inserted respectively into the holes 116.

A first port 122 and a second port 124, which are connected to a pressure fluid supply source via an unillustrated directional control valve, are formed on side surfaces of the end blocks 26*a*, 26*b*. A pressure fluid (for example, compressed air) is selectively supplied from the pressure fluid supply source to the first and second ports 122, 124. The first and second ports 122, 124 communicate respectively with cylinder chambers 126*a*, 126*b* (see FIG. 2) in the cylinder tube 22, via unillustrated passages disposed in the end blocks 26*a*, 26*b* and via bypass passages 46*a*, 46*b* provided in the cylinder tube 22. Cylinder chambers 126*a*, 126*b* are defined by the bore section 38, the end blocks 26*a*, 26*b* and the pistons 52*a*, 52*b* respectively.

As shown in FIG. 1, outer ports 128 are formed on end surfaces of the end blocks 26*a*, 26*b*. The outer ports 128 communicate with the cylinder chambers 126*a*, 126*b* in the cylinder tube 22, via unillustrated passages disposed in the end blocks 26*a*, 26*b* and via bypass passages 46*a*, 46*b* provided in the cylinder tube 22. The outer ports 128 are closed by threaded sealing screws 130.

As shown in FIG. 2, each of the end blocks 26*a*, 26*b* is provided with a decelerating mechanism 132, which is disposed on an inner wall surface side opposed to the cylinder tube 22, in order to decelerate the displacement speed of the pistons 52*a*, 52*b*.

The decelerating mechanism 132 includes a cylindrical member 134, which is installed on the end blocks 26*a*, 26*b* opposed to the pistons 52*a*, 52*b*. A check packing 136 is installed in an annular groove within the cylindrical member 134. Shaft sections 58 of the pistons 52*a*, 52*b* are inserted into the cylindrical members 134 when the pistons 52*a*, 52*b* are displaced in the axial direction. Accordingly, fluid that is contained in the cylindrical member 134, is discharged, at a minute flow rate, into the cylinder chambers 126*a*, 126*b*, via an unillustrated bypass passage having a minute flow passage. Therefore, a displacement resistance is brought about when the pistons 52*a*, 52*b* are displaced. Accordingly, the displacement speed of the pistons 52*a*, 52*b* can be gradually decelerated.

Figure 6:
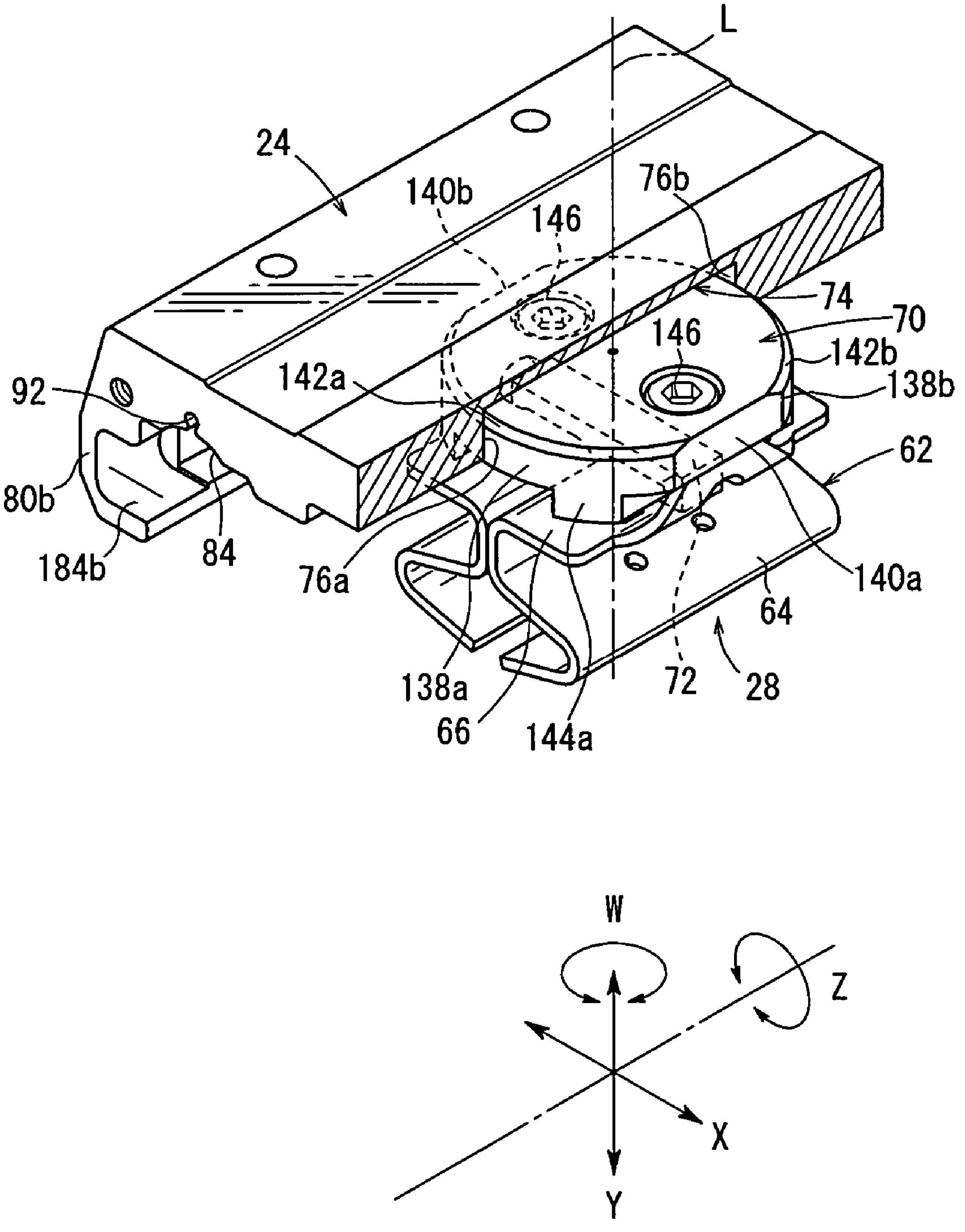
FIG. 6 is, in partial cutout, a perspective view illustrating an engagement state of a slider and a displacement difference-absorbing mechanism of the cylinder apparatus shown in FIG. 1.
Figure 7:
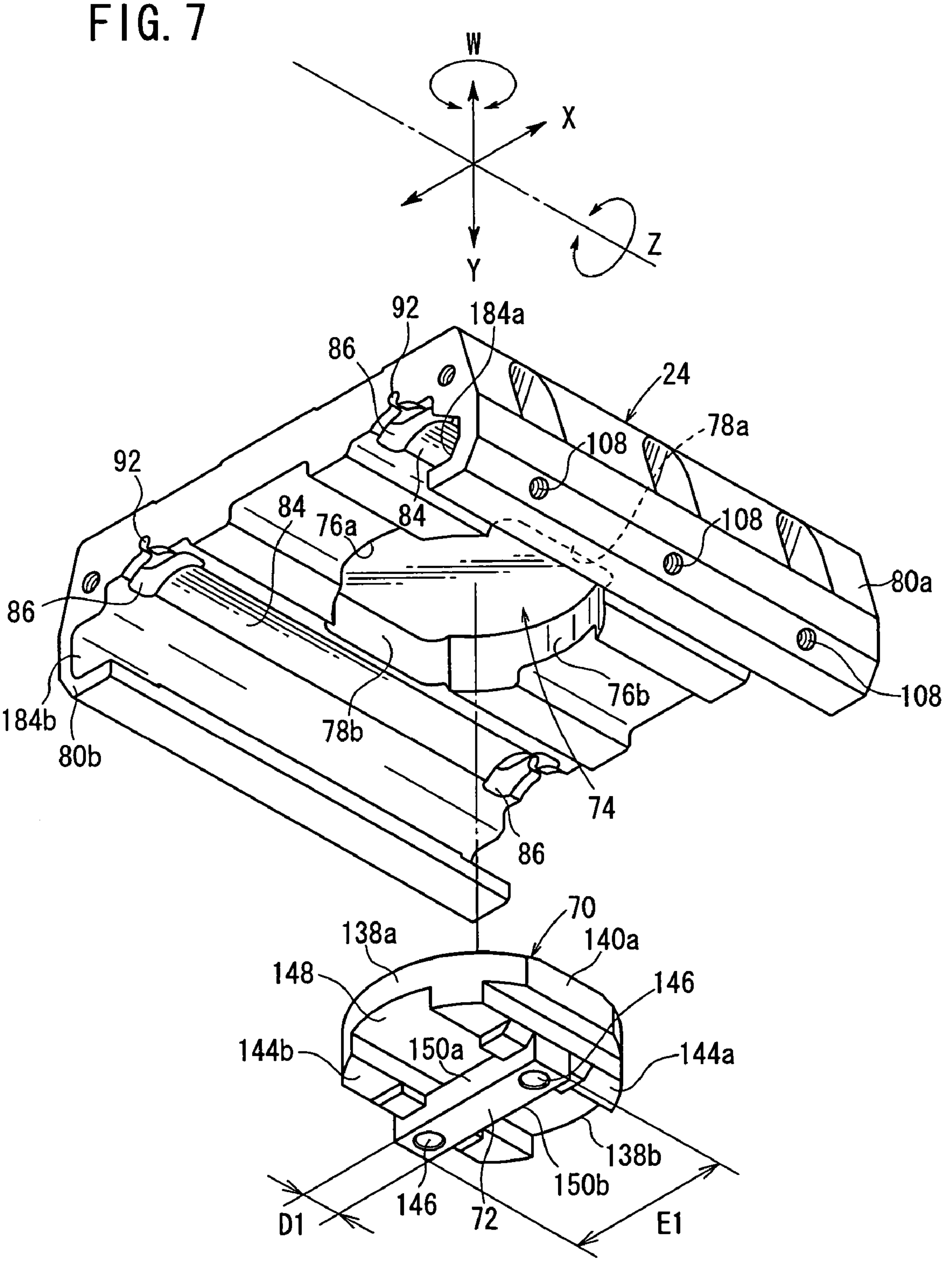
FIG. 7 is an exploded perspective view illustrating the slider and the coupler of the displacement difference-absorbing mechanism of the cylinder apparatus shown in FIG. 1, as viewed from a lower position.
Figure 8:
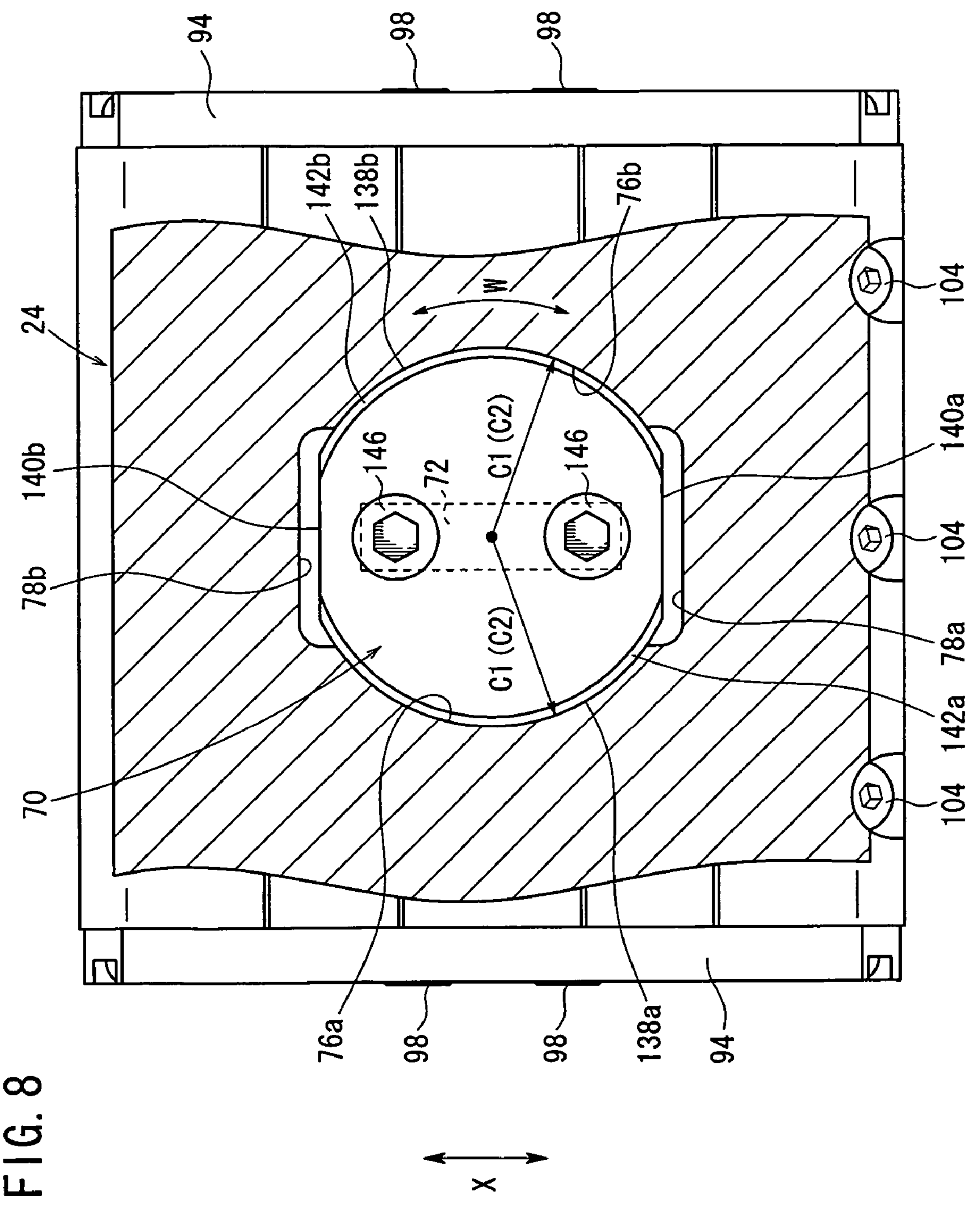
FIG. 8 is a sectional view taken along line VIII-VIII shown in FIG. 3.

As shown in FIGS. 6 to 8, the absorbing mechanism 28 includes a substantially disk-shaped coupler 70, which is installed on the yoke section 66 of the piston yoke 62. A pair of curved surface sections 138*a*, 138*b* having approximately the same radius C1 (see FIG. 8), and a pair of flat surface sections 140*a*, 140*b* provided substantially in parallel to the axis of the cylinder tube 22, are formed on the outer wall surface of the coupler 70.

As shown in FIG. 8, when the coupler 70 is inserted into the coupler-insertion hole 74 formed on the lower surface of the slider 24, the pair of curved surface sections 138*a*, 138*b* abut against the circular arc surfaces 76*a*, 76*b* of the coupler-insertion hole 74 in opposition thereto. The radius C1 of the curved surface sections 138*a*, 138*b* is substantially equal to the inner circumferential radius C2 of the circular arc surfaces 76*a*, 76*b* ($C1 \approx C2$). That is, the slider 24 is rotatable while sliding a predetermined amount in the direction of arrow W about the center of the vertical line L formed at the center of the coupler 70.

The pair of flat surface sections 140*a*, 140*b* are opposed respectively to the inner flat surface sections 78*a*, 78*b* of the coupler-insertion hole 74. Predetermined clearances are formed between the flat surface sections 140*a*, 140*b* and the inner flat surface sections 78*a*, 78*b*. As described above, the circular arc surfaces 76*a*, 76*b* and the inner flat surface sections 78*a*, 78*b* of the coupler-insertion hole 74 are formed so as to correspond to the outer circumferential shape of the coupler 70.

As shown in FIG. 5, chamfering sections 142*a*, 142*b*, each of which is inclined by a predetermined angle (for example 45°) in the circumferential direction of the curved surface sections 138*a*, 138*b*, are formed at boundary portions between the upper surface 77 and the curved surface sections 138*a*, 138*b* of the coupler 70 respectively.

The coupler 70 is not limited to the arrangement described above, which is composed of the pair of curved surface sections 138*a*, 138*b* and the pair of flat surface sections 140*a*, 140*b*. The coupler 70 may also be composed of a single cylindrical surface, based on the reference of the center of the coupler 70, so that one curved surface section 138*a* and the other curved surface section 138*b* are continuously connected.

On the other hand, as shown in FIG. 7, a pair of legs 144*a*, 144*b*, which are substantially parallel to the axis of the cylinder tube 22, are formed at lower portions of the coupler 70. A substantially rectangular parallelepiped-shaped engaging member 72 is installed by two bolts 146, through legs 144*a*, 144*b* that protrude from the lower surface of the coupler 70. The engaging member 72 is substantially perpendicular to the axis of the cylinder tube 22, with respect to the substantially central portion of the coupler 70. The engaging member 72 is positioned between the pair of legs 144*a*, 144*b* of the coupler 70.

A belt groove (insertion hole) 148, into which the upper belt 30 is inserted, is formed between the bottom surface of the coupler 70 and the engaging member 72. More specifically, when the coupler 70 is installed in the cylinder apparatus 20, the upper belt 30 is inserted into the clearance between the belt groove 148 and the engaging member 72.

Figure 9:
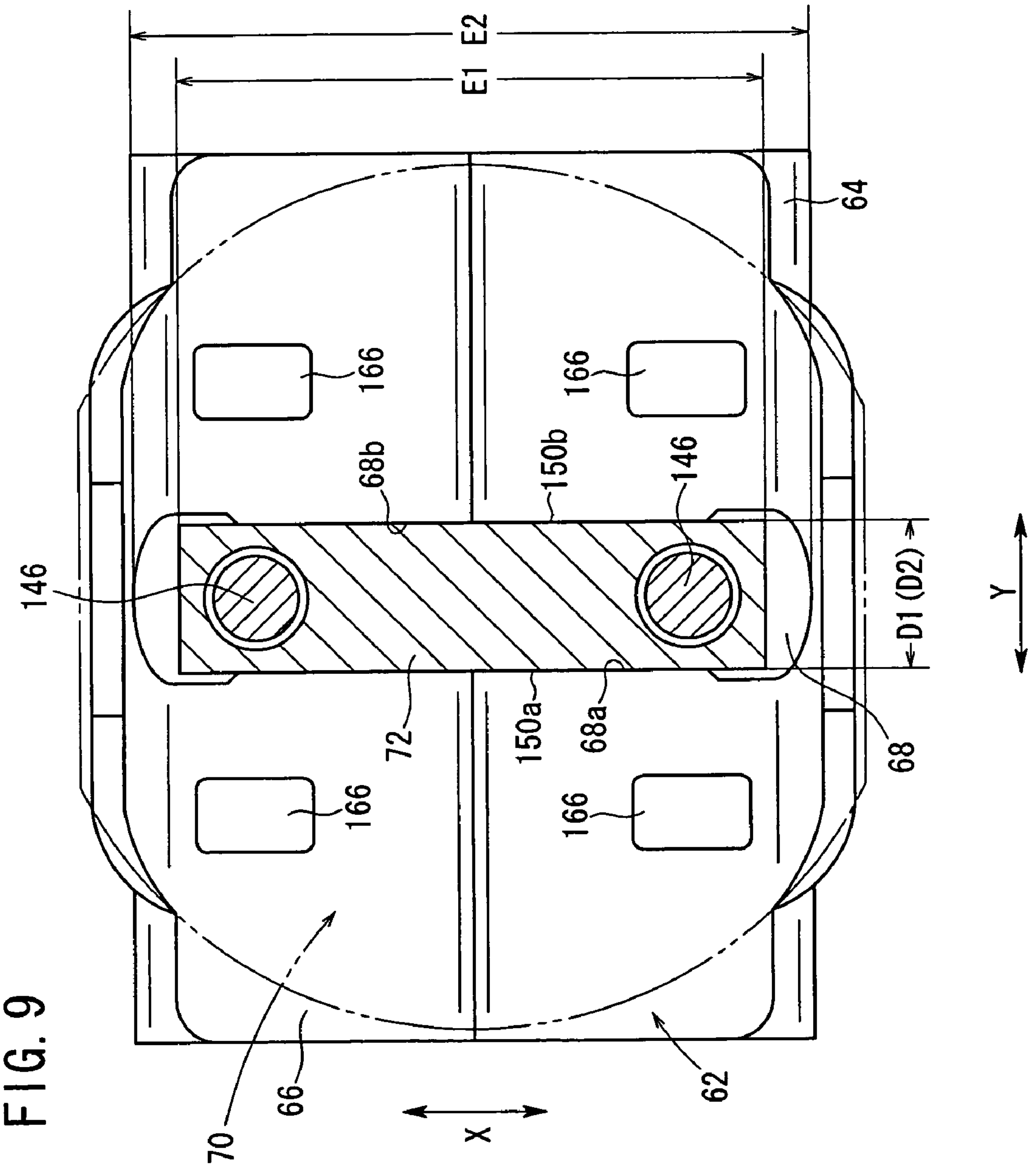
FIG. 9 is a partial lateral sectional view illustrating a state in which the coupler is engaged with a yoke section of a piston yoke shown in FIG. 6.

As shown in FIGS. 7 and 9, the engaging member 72 is formed so that the widthwise dimension D1 in the axial direction of the cylinder tube 22 is substantially equal to the widthwise dimension D2 of the engaging hole 68 ($D1 \approx D2$). The engaging member 72 further is provided with a pair of fitting surfaces (perpendicular surfaces) 150*a*, 150*b*, which are substantially perpendicular to the axis of the cylinder tube 22. When the engaging member 72 is inserted into the engaging hole 68, fitting surfaces 150*a*, 150*b* abut against the inner wall surfaces 68*a*, 68*b* of the engaging hole 68 respectively.

As shown in FIG. 9, the longitudinal dimension E1, which is substantially perpendicular to the axis of the cylinder tube 22, is smaller than the longitudinal dimension E2 of the engaging hole 68 ($E1 < E2$). That is, the engaging member 72 is displaceable by a slight amount ($E2 - E1$) in the widthwise direction (direction of arrow X) of the cylinder tube 22 with respect to the engaging hole 68.

The engaging member 72 is inserted into the engaging hole 68 of the piston yoke 62, providing a state in which the engaging member 72 and the engaging hole 68 are engaged with each other in the axial direction of the cylinder tube 22 (in the direction of arrow Y). Therefore, when the piston yoke 62 is displaced in the axial direction, the coupler 70 is displaced integrally with the piston yoke 62.

When the coupler 70 is installed in the piston yoke 62, the curved surface sections 138*a*, 138*b* are arranged on sides of the end blocks 26*a*, 26*b* and disposed substantially perpendicular to the axis of the cylinder tube 22, whereas the flat surface sections 140*a*, 140*b* are arranged substantially in parallel to the side surfaces of the cylinder tube 22.

As shown in FIGS. 2 and 5, the belt guide mechanism 34 includes a pair of guide members 152*a*, 152*b*, which are provided at upper portions of the pistons 52*a*, 52*b*, and wear rings 60*a*, 60*b*, which are connected respectively to the pistons 52*a*, 52*b*. Each of the guide members 152*a*, 152*b* is composed of a belt separator section 154, which has a substantially C-shaped cross section, a belt-holding section 156 that protrudes from a substantially central portion of the belt separator section 154 toward one end, and first and second pawls 158 and 160, which protrude on sides of the belt separator section 154 and the belt-holding section 156.

A substantially rectangular belt hole 162, into which the upper belt 30 is inserted, is formed between the belt separator section 154 and the belt-holding section 156. As shown in FIG. 2, the belt separator section 154, which has a substantially C-shaped cross section, is formed in a curved shape, such that sliding resistance of the upper belt 30 and the lower belt 32 does not increase excessively.

The belt separator section 154 is interposed between the upper belt 30 and the lower belt 32, which are curved and separated from each other vertically. The upper belt 30 is guided along the space formed between the belt separator section 154 and the slider 24. The lower belt 32 is guided along the space formed between the belt separator section 154 and the pistons 52*a*, 52*b*.

The belt-holding section 156 has a projection 164 that protrudes downwardly a predetermined length. The upper belt 30 is pressed by the projection 164 toward the cylinder tube 22, and thus the upper belt 30 and the lower belt 32 approach one another (see FIG. 2).

As shown in FIG. 5, the first pawls 158 protrude downwardly and are formed as a pair on both sides of the belt separator section 154. The first pawls 158 are installed respectively in grooves 166 formed in the yoke section 66 of the piston yoke 62. The second pawls 160 are installed on the lower surface of the yoke section 66. Accordingly, the piston yoke 62 and the guide members 152*a*, 152*b* are strongly and integrally connected to each other. That is, when the slider 24 is moved, the belt separator section 154 functions so as to cause the upper belt 30 and the lower belt 32 to separate away from each other, whereas the belt-holding section 156 functions to cause the upper belt 30 and the lower belt 32 to approach one another.

The wear rings 60*a*, 60*b* have a cross-sectional shape corresponding to the bore section 38. A substantially rectangular cutout 168 is formed substantially centrally on the upper surface thereof. A substantially rectangular lower belt guide section 170, which guides the lower belt 32, is formed on one end side of the cutout 168. The lower belt guide section 170 has one end, which is formed at a position in the height direction substantially equivalent to the outer circumferential surface of the wear rings 60*a*, 60*b*, and another end, which is curved slightly downward. The lower belt guide section 170 has a curved shape so that sliding resistance does not increase excessively when the lower belt 32 is guided thereby (see FIG. 2).

A magnet 172 is installed in a hole formed at one end of the wear rings 60*a*, 60*b*. The magnetic field of the magnet 172 is detected by an unillustrated sensor, which is installed in the sensor attachment groove 48 of the cylinder tube 22 (see FIG. 1). Accordingly, the position of the pistons 52*a*, 52*b* is detected. Pin members 176 are forcibly inserted respectively into pin holes 174 of the pistons 52*a*, 52*b*, and thus the two pistons 52*a*, 52*b* are mutually connected to the piston yoke 62 through the wear rings 60*a*, 60*b*.

As shown in FIGS. 3 and 10, the guide mechanism 36 is disposed in opposition to the guide sections 50*a*, 50*b* of the cylinder tube 22 at the retaining sections 80*a*, 80*b* of the slider 24. The guide mechanism 36 includes a first bearing support member 102, which opposes the side surface of the guide section 50*a* in one retaining section 80*a*, a second bearing support member 178, which opposes the guide section 50*b* in the other retaining section 80*b*, a first elastic member 180, which is interposed between the first bearing support member 102 and the retaining section 80*a*, and a second elastic member 182, which is interposed between the second bearing support member 178 and the retaining section 80*b*.

The first bearing support member 102 is installed in an installation groove 184*a* formed on the inner wall surface of one retaining section 80*a*. The first bearing support member 102 is fixed to the slider 24 by means of a plurality of fixing bolts 104 inserted into through-holes 100 formed in the retaining section 80*a*.

The first bearing support member 102 is formed of a metal material such as aluminum. The first bearing support member 102 is installed in abutment, so that the first bearing support member 102 is substantially perpendicular to the side surface of one guide section 50*a*.

A retaining groove 186, in which the bearing 82 is retained, is formed on the side surface of the first bearing support member 102 opposed to the guide section 50*a*. The retaining groove 186, which is formed in the axial direction, has substantially the same shape as the retaining groove 84 formed on the lower surface of the slider 24. Flange sections 88 of the bearing 82 engage with deep grooves 188 of the first bearing support member 102. Projections 90, which are formed on the flange sections 88, engage with recesses 92. The projections 90 protrude a predetermined length from end surfaces of the flange sections 88 respectively.

On the other hand, as shown in FIG. 3, the first bearing support member 102 has an installation hole 190 which faces the screw holes 108 for screw-engaging the fixing bolts 104 therewith, and which is formed on the side surface to abut against the retaining section 80*a* of the slider 24. The first elastic member 180 is installed in the installation hole 190.

The first elastic member 180 is composed of a spring such as a plate spring. As shown in FIG. 10, the first elastic member 180 is bent at a plurality of positions in a wavy form. A plurality of (for example, three) portions of the first elastic member 180, which are convex toward the first bearing support member 102, abut against the inner wall surface of the installation hole 190. Further, a plurality of (for example, four) portions, which are concave, abut against the inner wall surface of the installation groove 184*a* of the slider 24. That is, the resilient force of the first elastic member 180 urges the first bearing support member 102 and the retaining section 80*a* of the slider 24 in directions to separate away from each other.

Portions of the first elastic member 180, which abut against the inner wall surface of the installation hole 190, are pressed by a plurality of (for example, three) plugs 106, which are screw-engaged with the retaining section 80*a* of the slider 24.

The second bearing support member 178 shown in FIGS. 3 and 10 is formed of a metal material such as aluminum. The second bearing support member 178 is installed in an installation groove 184*b* formed on an inner wall surface of the other retaining section 80*b*. A portion of the second bearing support member 178, which is installed in the installation groove 84*b*, is substantially horizontal. Another portion thereof, which is disposed on the side of the other guide section 50*b*, abuts substantially perpendicularly against the side surface of the guide section 50*b*.

A retaining groove 192, which retains the bearing 82, extends in the axial direction along the side surface of the second bearing support member 178 opposed to the guide section 50*b*. The retaining groove 192 has substantially the same shape as the retaining groove 84 formed on the lower surface of the slider 24. Flange sections 88 of the bearing 82 engage with deep grooves 194 formed at both ends of the second bearing support member 178.

Projections 90, which protrude toward the end blocks 26*a*, 26*b* respectively, are formed on end surfaces of the flange sections 88. The projections 90 engage with recesses 92, which are formed on end surfaces of the second bearing support member 178, when the flange sections 88 engage with the deep grooves 194.

The plate-shaped second elastic member 182, composed of a hard rubber material or the like, is interposed between the second bearing support member 178 and an inner wall surface of the installation groove 184*b*. A slit hole 196, extending in the longitudinal direction, is formed at a substantially central portion of the second elastic member 182. The slit hole 196 engages with a convex engaging projection 198, which is formed on a side surface of the second bearing support member 178. Accordingly, relative displacement of the second elastic member 182 is regulated with respect to the second bearing support member 178.

As described above, the second elastic member 182 is disposed between the second bearing support member 178 and the slider 24. Accordingly, the second bearing support member 178 is pressed toward the guide section 50*b* due to the resilient force of the second elastic member 182.

Bearings 82 are provided in the retaining grooves 84 of the slider 24, and in the first and second bearing support members

102, 178 installed in the slider 24, respectively. The bearings 82 abut against the guide sections 50*a*, 50*b* of the cylinder tube 22. Accordingly, the slider 24 is smoothly displaced along the fitting surfaces 150*a*, 150*b* between the guide sections 50*a*, 50*b*.

The cylinder apparatus 20, including the displacement difference-absorbing mechanism according to the embodiment of the present invention, is basically constructed as described above. Next, operations, functions and effects of the cylinder apparatus shall be explained. Such explanations shall be made assuming that the initial position resides in a state in which the slider 24 and the pistons 52*a*, 52*b* are displaced toward one end block 26*a* (in the direction of arrow B).

At first, in the initial position, pressure fluid (for example, compressed air) is supplied to the first port 122 of the end block 26*a*. Accordingly, pressure fluid is introduced into one cylinder chamber 126*a* in the cylinder tube 22, via an unillustrated passage of the end block 26*a*. The piston 52*a* is pressed toward the other end block 26*b* (in the direction of arrow A) under a pressing action effected by the pressure fluid. The slider 24 is displaced in the axial direction under a guiding action of the guide sections 50*a*, 50*b* integrally with the piston 52*a* while being supported by the piston yoke 62 and the coupler 70. In this situation, the second port 124 is open to atmospheric air.

During this operation, the upper belt 30 and the lower belt 32 disposed on the right side of the slider 24, which have been closed by means of the lower belt guide section 170 and the belt-holding section 156 of the guide member 152*b*, are opened by the belt separator section 154 as the slider 24 is displaced. Conversely, the upper belt 30 and the lower belt 32 disposed in the vicinity of the central portion of the slider 24, which have been opened by the belt separator section 154 of the guide member 152*a*, are closed by the lower belt guide section 170 and the belt-holding section 156 of the belt guide mechanism 34 as the slider 24 is displaced.

That is, the slider 24 is displaced in the axial direction (direction of arrow A) along the cylinder tube 22, such that the slit 40 remains sealed and the bore section 38 remains closed by means of the upper belt 30 and the lower belt 32.

The slider 24 is further displaced toward the other end block 26*b* (in the direction of arrow A), whereupon the shaft section 58, provided at the end of the piston 52*b*, is inserted into the cylindrical member 134. Accordingly, the flow rate of fluid that flows between the shaft section 58 and the interior of the cylindrical member 134 is blocked by the check packing 136 and the outer circumferential surface of the shaft section 58. The flow passage of the fluid is restricted to only the unillustrated bypass passage. Therefore, displacement is effected while the displacement speed of the pistons 52*a*, 52*b* is lowered. The end surface of the piston 52*b* abuts against the end surface of the cylindrical member 134 and thereby arrives at its displacement terminal end position.

Subsequently, when an unillustrated directional control valve is switched to supply pressure fluid to the second port 124, the pressure fluid is introduced into the other cylinder chamber 126*b* of the cylinder tube 22, via an unillustrated passage in the end block 26*b*. The piston 52*b* is pressed toward one end block 26*a* (in the direction of arrow B) due to the pressing action effected by the pressure fluid. The slider 24 is displaced in the axial direction (direction of arrow B) along the guide sections 50*a*, 50*b* of the cylinder tube 22 together with the piston 52*b*.

In this situation, the upper belt 30 and the lower belt 32, which are closed by the lower belt guide section 170 and the belt-holding section 156, are opened by the belt separator section 154 of the guide member 152*a*, opposite to the situation in which the slider 24 is displaced toward the other end block 26*b*. The upper belt 30 and the lower belt 32, which are opened by the belt separator section 154 of the guide member 152*b*, are then closed by the belt-holding section 156 and the lower belt guide section 170.

The slider 24 is further displaced toward one end block 26*a* (in the direction of arrow B), and the shaft section 58, which is provided on the piston 52*a*, is inserted into the cylindrical member 134. Accordingly, the displacement speed of the pistons 52*a*, 52*b* is first lowered, and then the end surface of the piston 52*a* abuts against the end surface of the cylindrical member 134. Accordingly, displacement is stopped and the slider 24 is restored to its initial position.

Next, an explanation shall be made concerning functions of the present invention to absorb displacement differences generated in the slider 24 by means of the absorbing mechanism 28, when loads are applied to the slider 24 in various directions.

At first, as shown in FIG. 6, when a load is applied to the slider 24 from the outside in the horizontal direction (direction of arrow X) substantially perpendicular to the axis of the slider 24, the coupler 70 is displaced in the direction (direction of arrow X) substantially perpendicular to the axis of the slider 24 in the engaging hole 68 of the piston yoke 62 by the aid of the engaging member 72. In particular, the fitting surfaces 150*a*, 150*b* of the engaging member 72 are displaced linearly in the direction of arrow X while making sliding movement along the inner wall surfaces 68*a*, 68*b* of the engaging hole 68. Accordingly, the displacement difference in the horizontal direction substantially perpendicular to the axis, which is generated in the slider 24, is appropriately absorbed.

On the other hand, when a load is applied to the slider 24 in a substantially vertical direction (direction of arrow Y), the slider 24 makes sliding displacement in a substantially vertical direction along the curved surface sections 138*a*, 138*b* of the coupler 70 through the circular arc surfaces 76*a*, 76*b* of the coupler-insertion hole 74. Simultaneously, the engaging member 72 of the coupler 70 is displaced in a substantially vertical direction along inner wall surfaces 68*a*, 68*b* of the engaging hole 68 of the piston yoke 62 through the fitting surfaces 150*a*, 150*b*. Accordingly, the displacement difference in the vertical direction, which is generated in the slider 24, is appropriately absorbed.

When a load is applied to the slider 24 in a rotational direction (direction of arrow W) about the center of the vertical line L of the coupler 70, the slider 24 undergoes rotational displacement while sliding along the circular arc surfaces 76*a*, 76*b* with respect to the curved surface sections 138*a*, 138*b* of the coupler 70. Accordingly, the displacement difference between the slider 24 and the coupler 70 can be absorbed. That is, the displacement difference can be absorbed appropriately in the rotational direction (direction of arrow W) about the center of the vertical line L with respect to the slider 24.

Finally, when a load is applied in the rotational direction (direction of arrow Z) about the center of the axis of the slider 24, the engaging member 72 of the coupler 70 is rotationally displaced through the abutment portions, between the fitting surfaces 150*a*, 150*b* and the inner wall surfaces 68*a*, 68*b* of the engaging hole 68. Accordingly, the displacement difference between the coupler 70 and the piston yoke 62 can be absorbed. That is, the displacement difference applied to the slider 24 in the rotational direction (direction of arrow Z) about the center of the axis of the slider 24 is appropriately absorbed.

As described above, in the cylinder apparatus 20, to which the displacement difference-absorbing mechanism according to the embodiment of the present invention is applied, when loads are applied to the slider 24 in the horizontal direction (direction of arrow X) substantially perpendicular to the axis, in the vertical direction (direction of arrow Y), in the rotational direction (direction of arrow W) about the center of the vertical line L, and in the rotational direction (direction of arrow Z) about the center of the axis of the slider 24, the slider 24 undergoes respective linear and rotational displacements with respect to the coupler 70 by means of the absorbing mechanism 28, and the coupler 70 undergoes linear and rotational displacements relatively with respect to the piston yoke 62. Accordingly, displacement differences generated in the slider 24 can be appropriately absorbed.

In other words, the slider 24 and the piston yoke 62 are relatively displaceable linearly or rotationally by the aid of the coupler 70. Therefore, displacement differences generated in various directions with respect to the slider 24 can be absorbed by allowing the slider 24 and the coupler 70 to perform relative displacements respectively.

As a result, even when loads are applied to the slider 24, the displacement difference can be appropriately absorbed by the absorbing mechanism 28, and the slider 24 can be smoothly displaced with respect to the cylinder tube 22.

In the absorbing mechanism 28, the curved surface sections 138*a*, 138*b* of the coupler 70 abut against the circular arc surfaces 76*a*, 76*b* of the slider 24, and the engaging member 72 of the coupler 70 abuts against the engaging hole 68 of the piston yoke 62 through the fitting surfaces 150*a*, 150*b*. Therefore, loads applied to the slider 24 can be borne by contact portions between circular arc surfaces 76*a*, 76*b* and the curved surface sections 138*a*, 138*b*, and contact portions between the engaging member 72 and the engaging hole 68.

Therefore, the area of the contact portions, which bear the load in the displacement direction applied to the displacement member, i.e., the contact area between the slider 24, the coupler 70, and the piston yoke 62, can be increased, as compared with the conventional displacement difference-absorbing mechanism. Accordingly, the load in the displacement direction can be appropriately dispersed at the contact portions. Accordingly, larger loads can be handled, which exceed loads that have hitherto been borne by conventional displacement difference-absorbing mechanisms.

In other words, a large projection area is provided in the axial direction of the absorbing mechanism 28. Therefore, generation of stress can be suppressed, when loads are applied in the displacement direction, thereby improving durability.

The coupler 70, which constitutes the absorbing mechanism 28, is internally installed between the slider 24 and the piston yoke 62 that is connected to the pistons 52*a*, 52*b*. Further, the belt groove 148, which allows the upper belt 30 to pass therethrough, is formed between the coupler 70 and the engaging member 72. Therefore, the upper belt 30 is not exposed to the outside. Further, the contour size of the cylinder apparatus is not increased, as compared with the conventional cylinder apparatus in which a displacement difference-absorbing mechanism must be provided outside the slider. Therefore, the cylinder apparatus 20 containing therein the absorbing mechanism 28 can be made smaller in size.

Figure 11:
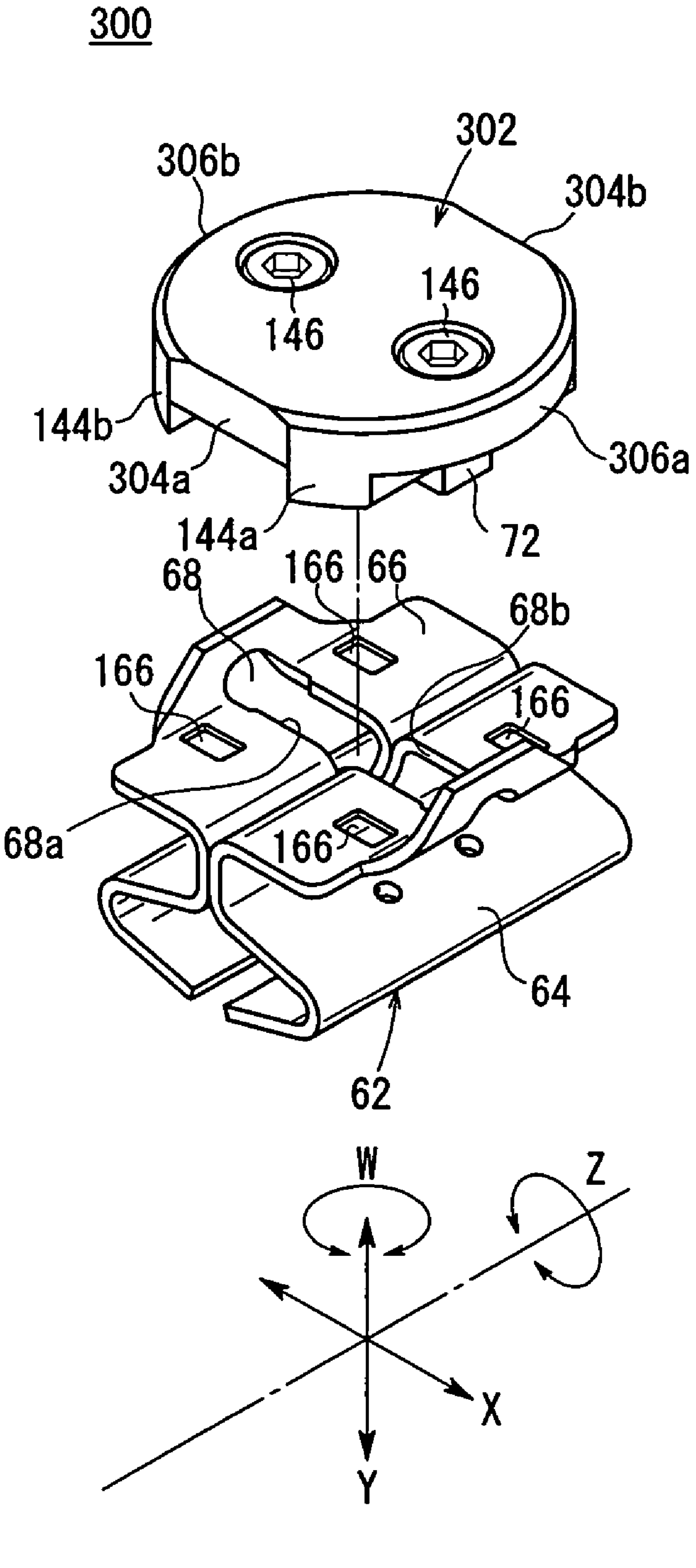
FIG. 11 is an exploded perspective view illustrating a displacement difference-absorbing mechanism and a piston yoke according to a modified embodiment.
Figure 12:
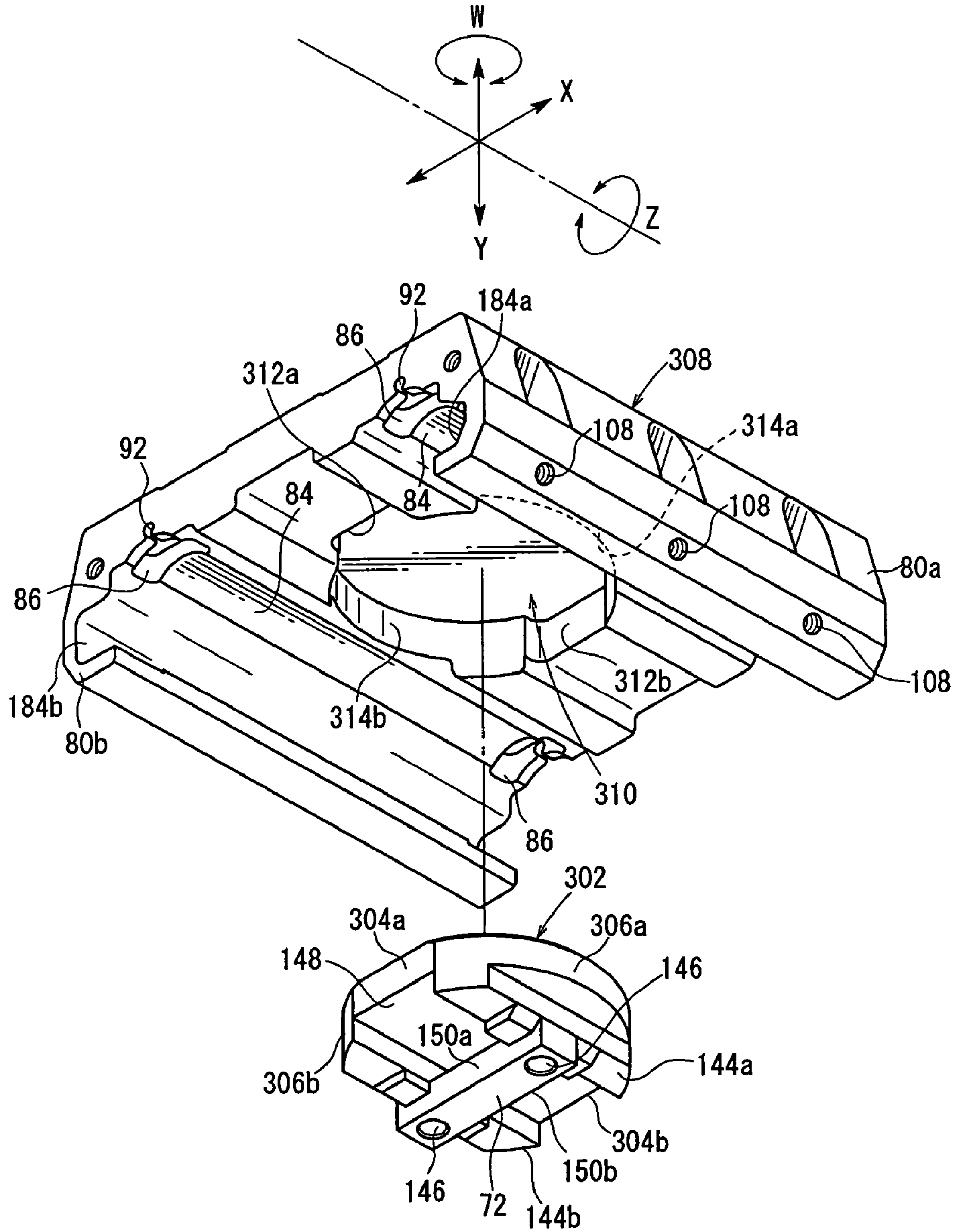
FIG. 12 is an exploded perspective view illustrating a state in which a coupler of the displacement difference-absorbing mechanism shown in FIG. 11 and a slider with which the coupler is engaged are viewed from a lower position.
Figure 13:
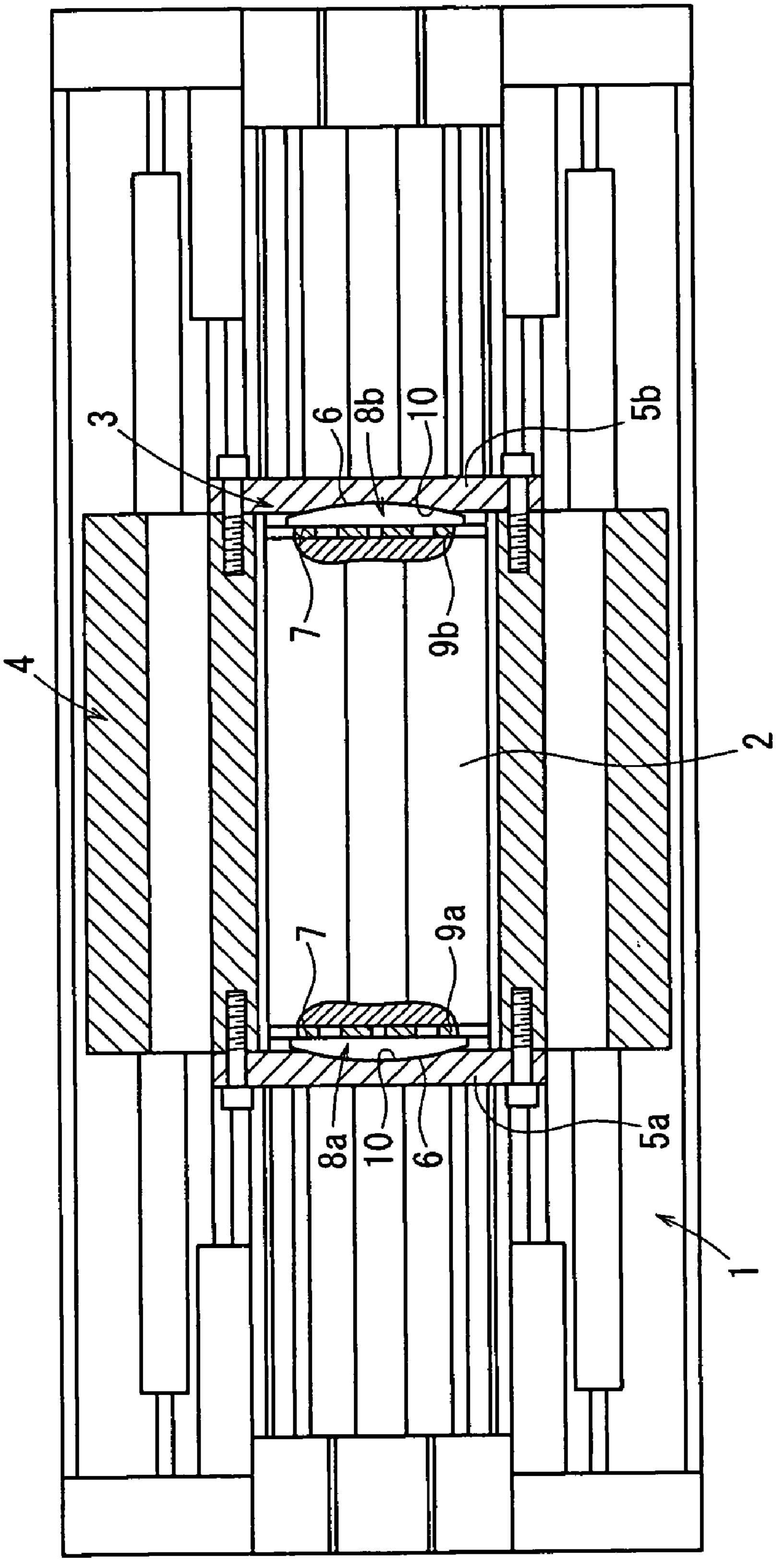
FIG. 13 is, in partial cross section, a plan view illustrating a rodless cylinder having a displacement difference-absorbing mechanism according to a conventional technique.

Next, a displacement difference-absorbing mechanism 300 according to a modified embodiment is shown in FIGS. 11 and 12. Constitutive components, which are the same as those of the displacement difference-absorbing mechanism 28 according to the above-described embodiment of the present invention, shall be designated using the same reference numerals, and detailed explanation thereof shall be omitted.

The displacement difference-absorbing mechanism 300 according to the modified embodiment differs from the displacement difference-absorbing mechanism 28 in that a coupler 302 is provided, having a pair of flat surface sections 304*a*, 304*b*, which are substantially perpendicular to the axis of the cylinder tube 22, and circular arc-shaped curved surface sections 306*a*, 306*b*, which are formed alongside respective side surfaces of the cylinder tube 22. Further, a coupler-insertion hole 310 is formed in the slider 308, providing a recess with a substantially disk-shaped cross section corresponding to the shape of the coupler 302.

The coupler-insertion hole 310 includes a pair of inner flat surface sections 312*a*, 312*b*, which are opposed to the flat surface sections 304*a*, 304*b* of the coupler 302 when the coupler 302 is inserted therein, and a pair of circular arc surfaces 314*a*, 314*b*, which are opposed to the curved surface sections 306*a*, 306*b* of the coupler 302. The curved surface sections 306*a*, 306*b* abut against the circular arc surfaces 314*a*, 314*b*.

As shown in FIG. 12, the engaging member 72 provided at the lower portion of the coupler 302 is inserted into the engaging hole 68 of the piston yoke 62 that is connected to the pistons 52*a*, 52*b*.

In the displacement difference-absorbing mechanism 300, when a load is applied to the slider 308 in the horizontal direction (direction of arrow X) substantially perpendicular to the axis of the slider 308, the coupler 302 is displaced in the direction (direction of arrow X) substantially perpendicular to the axis of the slider 308, while undergoing sliding movement along the inner wall surfaces 68*a*, 68*b* of the engaging hole 68 of the piston yoke 62 through the engaging member 72. Accordingly, the displacement difference generated in a direction substantially perpendicular to the axis of the slider 308 can be appropriately absorbed.

When a load is applied to the slider 308 in the vertical direction (direction of arrow Y), the slider 308 undergoes sliding displacement in a substantially vertical direction, along the curved surface sections 306*a*, 306*b* of the coupler 302, while the engaging member 72 of the coupler 302 is displaced in a substantially vertical direction along the inner wall surfaces 68*a*, 68*b* of the engaging hole 68 of the piston yoke 62. Accordingly, the displacement difference generated in the vertical direction with respect to the slider 308 can be appropriately absorbed.

When a load is applied to the slider 308 in the rotational direction (direction of arrow W) about the center of the vertical line L of the coupler 302, the slider 308 undergoes rotational displacement while effecting sliding movement of the circular arc surfaces 314*a*, 314*b* with respect to the curved surface sections 306*a*, 306*b* of the coupler 302. Accordingly, the slider 308 is rotated a predetermined amount with respect to the coupler 302, and thus it is possible to appropriately absorb the displacement difference.

In the displacement difference-absorbing mechanism 300, the curved surface sections 306*a*, 306*b* of the coupler 302 abut against the circular arc surfaces 314*a*, 314*b* of the slider 308, and the engaging member 72 of the coupler 302 abuts against the engaging hole 68 of the piston yoke 62. Therefore, loads applied to the slider 308 can be borne by contact portions between the circular arc surfaces 314*a*, 314*b* and the curved surface sections 306*a*, 306*b*, and by contact portions between the engaging member 72 and the engaging hole 68.

That is, mutual contact areas of the slider 308, the coupler 302, and the piston yoke 62, which bear the load, can be increased. Therefore, the load can be dispersed appropriately at such contact portions.

The displacement difference-absorbing mechanism 300 according to the foregoing modified embodiment has been described with reference to loads applied to the slider 308, which are exerted in a single direction (for example, the horizontal direction or the vertical direction). However, the present invention is not limited in this manner. Even when a displacement difference is generated simultaneously in a plurality of different directions with respect to the slider 308, the displacement difference can be absorbed appropriately by the displacement difference-absorbing mechanism 300.

Although certain preferred embodiments of the present invention have been shown and described in detail, it should be understood that various changes and modifications may be made therein without departing from the scope of the appended claims.

What is claimed is:

1. A displacement difference-absorbing mechanism for a cylinder apparatus including a main cylinder body and a belt that closes a slit extending in an axial direction, and wherein a piston is displaceable in the axial direction under an action of a pressure fluid supplied from a pressure fluid inlet/outlet port, said displacement difference-absorbing mechanism comprising:

a displacement member displaceable in the axial direction along said main cylinder body;

a displacement-transmitting member connected to said piston, which transmits displacement of said piston to said displacement member; and a displacement difference-absorbing member provided between said displacement member and said displacement-transmitting member, which is relatively displaceable with respect to said displacement transmitting member, and which has a perpendicular surface disposed substantially perpendicular to a displacement direction of said displacement member, and a curved surface having a constant radius about a center of a vertical line, wherein said displacement difference-absorbing member is arranged such that said perpendicular surface is fitted to one of said displacement member and said displacement-transmitting member, and said curved surface is fitted to another one of said displacement member and said displacement-transmitting member.

2. The displacement difference-absorbing mechanism according to claim 1, wherein said displacement difference-absorbing member is arranged such that said perpendicular surface is fitted to said displacement-transmitting member, and said curved surface is fitted to said displacement member.

3. The displacement difference-absorbing mechanism according to claim 2, wherein said curved surface is formed in said displacement direction of said displacement member.

4. The displacement difference-absorbing mechanism according to claim 2, wherein said curved surface is formed in a direction substantially perpendicular to said displacement direction of said displacement member.

5. The displacement difference-absorbing mechanism according to claim 2, wherein an insertion hole, into which said belt is inserted, is formed in said displacement difference-absorbing member.

6. The displacement difference-absorbing mechanism according to claim 2, wherein a first fitting hole, to which said displacement difference-absorbing member is fitted, is formed in said displacement member, and said displacement member and said displacement difference-absorbing member are relatively rotatable through said first fitting hole.

7. The displacement difference-absorbing mechanism according to claim 6, wherein said first fitting hole has a radius which is substantially equal to a radius of said curved surface.

8. The displacement difference-absorbing mechanism according to claim 7, wherein said curved surface abuts against an inner circumferential surface of said first fitting hole, and said displacement member and said displacement difference-absorbing member are slidably displaceable along said inner circumferential surface and said curved surface.

9. The displacement difference-absorbing mechanism according to claim 2, wherein a second fitting hole, to which said displacement difference-absorbing member is fitted, is formed in said displacement-transmitting member, and said displacement-transmitting member and said displacement difference-absorbing member are relatively displaceable through said second fitting hole.

10. The displacement difference-absorbing mechanism according to claim 9, wherein said displacement difference-absorbing member is vertically and horizontally displaceable perpendicular to said displacement direction of said displacement-transmitting member with respect to said second fitting hole.

11. The displacement difference-absorbing mechanism according to claim 10, wherein a longitudinal dimension of said second fitting hole perpendicular to said displacement direction of said displacement-transmitting member is larger than a longitudinal dimension of said displacement difference-absorbing member.

12. The displacement difference-absorbing mechanism according to claim 11, wherein a widthwise dimension of said displacement-transmitting member in said displacement direction is substantially equal to a widthwise dimension of said second fitting hole.

13. The displacement difference-absorbing mechanism according to claim 12, wherein said perpendicular surfaces of said displacement difference-absorbing member abut against respective side surfaces of said second fitting hole in a widthwise direction.

* * * * *